United States Patent [19]

Sturm

[11] Patent Number: 5,431,537
[45] Date of Patent: Jul. 11, 1995

[54] COOLED GAS TURBINE BLADE

[75] Inventor: Shimon Sturm, Wethersfield, Conn.

[73] Assignee: United Technologies Corporation, Hartford, Conn.

[21] Appl. No.: 229,486

[22] Filed: Apr. 19, 1994

[51] Int. Cl.⁶ ............................................. F01D 5/18
[52] U.S. Cl. ................................. 416/97 R; 415/115
[58] Field of Search ............. 415/115, 116; 416/97 R

[56] References Cited

U.S. PATENT DOCUMENTS

| | | | |
|---|---|---|---|
| 3,627,443 | 12/1971 | Pirzer | 415/115 |
| 4,416,585 | 11/1983 | Abdel-Messeh | 416/97 R |
| 4,514,144 | 4/1985 | Lee | 416/97 R |
| 5,052,889 | 10/1991 | Abdel-Messeh | 416/97 R |
| 5,232,343 | 8/1993 | Butts | 416/97 R |
| 5,259,730 | 11/1993 | Damlis et al. | 416/97 R |

Primary Examiner—Edward K. Look
Assistant Examiner—Michael S. Lee
Attorney, Agent, or Firm—Edward L. Kochey, Jr.

[57] ABSTRACT

A hollow air cooled airfoil blade (10) castable with a single pull core and having internal trip strips (28) at the leading edge. Parallel ribs (16,18) extend from the pressure side (12) of the blade to the suction side (14). A parting line (32) passes through the most forward point (34) of the airfoil, this being located on the suction side of the leading edge (36). The trip strips stop short of the parting line.

4 Claims, 1 Drawing Sheet

COOLED GAS TURBINE BLADE

TECHNICAL FIELD

The invention relates to air cooled blades for gas turbines and in particular the blades having internal trip strips extending around the leading edge and which blades are castable with a single pull core.

Background of the Invention

Gas turbine engines achieve their maximum efficiency at high temperature. The blades of these turbines therefore operate extremely close to the maximum allowable metal temperature. They therefore require cooling. The leading edge can be particularly hot and special attention must be paid to this portion of the blade.

Air cooled gas turbine blades are provided with internal flowpaths for the passage of cooling air flow. It is important to get the maximum cooling with the minimum flow of air. Trip strips are frequently located on the internal surface of the blade to increase the heat transfer rate. These are usually placed at an angle approximately 45° from the direction of flow. It is desirable to have these trip strips at the leading edge where there is not only high heat transfer, but a large amount of heat absorbing area exposed to the gas as compared to the relatively small metal area exposed to the cooling air flow.

Casting of the blades involves the use of a ceramic core around which the blade is cast. This core is then leached out leaving behind an air flow passage and the internal surface configuration.

The core itself is formed by injecting slurry into a mold formed by dies. The dies must then be opened to obtain the core. Some shapes require multiple pull dies because of the complex configuration. It is preferable to have only two dies with the single pull require to release the core.

SUMMARY OF THE INVENTION

The hollow air cooled turbine blade is castable with a single pull core and has trip strips at the leading edge. The airfoil has a pressure side and a suction side with a plurality of parallel ribs extending from the pressure side to the suction side. A parting line, which is representative of a die parting line for the formation of a ceramic core, passes through the ribs and through the most forward point of the airfoil measured perpendicular to these ribs.

The aerodynamic leading edge of the airfoil is located on the pressure side wall side of the most forward point through which the parting line passes. Trip strips on the pressure side extend around the leading edge stopping short of the parting line. The trip strips on the suction side also stop short of the parting line. The distance between the parting line and the trip strips on the pressure side is greater than the distance between this parting line and the end of the trip strips on the suction side.

DESCRIPTION OF THE PREFERRED EMBODIMENT

Figure 1:
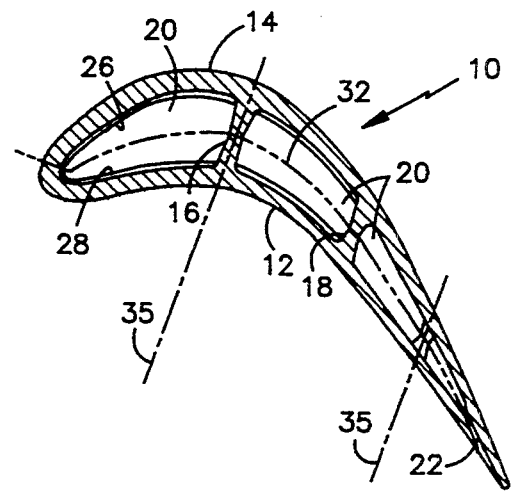
FIG. 1 is a section through a blade.
Figure 2:
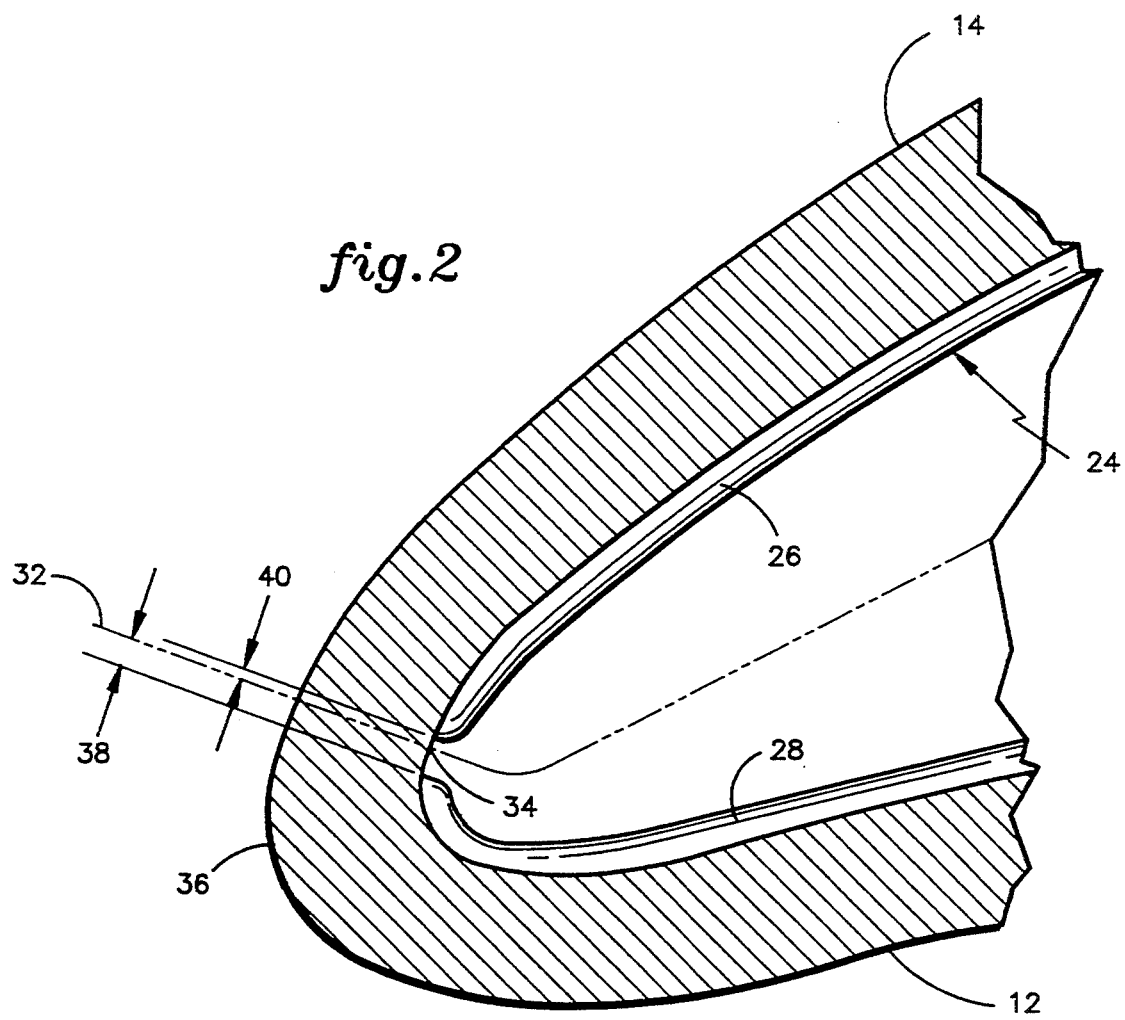
FIG. 2 is a section through the front end of the blade.

FIG. 1 shows the hollow turbine blade 10. This is an airfoil having a pressure side 12 and a suction side 14. A plurality of parallel ribs 16,18 extend from the pressure side to the suction side. An airflow passage 20 passes through the blade with the various sections of this passage being connected in a serpentine manner to permit airflow through the blade. Air discharge openings 22 discharge a portion of the airflow while other portions of the airflow pass through cooling holes in the blade (not shown). The flow through these passages is substantially radial with respect to the rotor, which is perpendicular to the plane of the paper in FIG. 1.

Trip strips 24 are formed inside the blade and arranged at an angle of approximately 45° with respect to the direction of airflow. This creates the turbulence along the surface of the blade increasing the heat transfer and accordingly the cooling effect of the air. Trip strips 26 are located on the suction side of the blade with trip strips 28 being located on the pressure side of the blade. These are located in staggered configuration with respect to one another.

In casting the blade a core must first be manufactured having the shape and volume of the space 20 within the blade. The blade is cast around this with the ceramic core then leached out. This core has the shape of the airflow passages including the connections to adjacent airflow passes. It also has on it's surface the appropriate indentations to form the trip strips 28 and 26.

For simplicity of tool design and manufacture it is preferable that this core be manufactured with a single pull die. The two die halves are manufactured and are reusable. A slurry is injected between the dies and allowed to harden. The dies then must be opened and they are pulled apart in a direction parallel to ribs 16 and 18. It can be appreciated that as these dies are pulled apart from one another, no portion of the core can be shaped in such a way that it locks into either one of the dies. In the conventional blade design with the internal trip strips, the trip strips are passing at an angle of about 45° with respect to the axes of the blade. As these trip strips pass around a leading edge they are directed at an angle of 45° with respect to the pulled direction. Accordingly the die would lock onto the core and would therefore would not be possible to form these trip strips without a multiple pull die.

FIG. 1 shows a parting line 32 passing through longitudinal length of the blade. Point 34 is the most forward point of the airfoil measured perpendicular to the centerline 35 of the ribs. The parting line 32 passes through this point. At this point (on the core) the dies are pulled directly away from one another, and the skewed trip strips cannot be located here. Trip strips 28 passing around the leading edge 36 stop a distance 38 short of the parting line. Trip strips 26 on the suction side 14 of the blade stop a distance 40 short of the parting line. The direction of the surface of the blade with respect to the perpendicular to the parting line changes relatively rapidly on the suction side and accordingly a relatively small cutback is required. On the other hand the change of the direction of the inside surface with respect to the perpendicular to the parting line on the suction side changes less rapidly and therefore additional cutback is provided.

By this arrangement of the forward end as measured in the line perpendicular to the ribs being located on the suction side of the leading edge permits the achievement of the trip strips at the highly heated leading edge while requiring only a single pull core.

I claim:

1. A hollow air cooled turbine blade, castable with a single pull core, and having trip strips at the leading edge comprising:
   an airfoil having a pressure side and a suction side;
   a plurality of parallel ribs extending from said pressure side to said suction side;
   a parting line, representative of a die parting line for the formation of a ceramic core, passing through said ribs at the most forward point of said airfoil measured perpendicular to said ribs;
   an aerodynamic leading edge of said airfoil of a minimum radius located on the pressure side wall side of said most forward point; and
   trip strips on said pressure side extending around said leading edge and stopping short of said parting line.

2. A hollow air cooled turbine blade as in claim 1, further comprising:
   trip strips on said suction side stopping short of said parting line a distance less than the distance which said trip strips on said pressure side stops short of said parting line.

3. A hollow air cooled turbine blade as in claim 2, further comprising: said airfoil having a radial direction from a root toward a tip; and said trip strips arranged at an angle of approximately 45° from said radial direction.

4. A hollow air cooled turbine blade as in claim 1, further comprising:
   said airfoil having a radial direction from a root toward a tip; and said trip strips arranged at an angle of approximately 45° from said radial direction.

* * * * *